(12) United States Patent
Higuchi et al.

(10) Patent No.: US 9,718,930 B2
(45) Date of Patent: Aug. 1, 2017

(54) PROCESS FOR PRODUCING POLYTETRAFLUOROETHYLENE MOLDING POWDER AND PROCESS FOR PRODUCING POLYTETRAFLUOROETHYLENE AGGLOMERATED PRODUCT

(71) Applicant: ASAHI GLASS COMPANY, LIMITED, Tokyo (JP)

(72) Inventors: Shinya Higuchi, Tokyo (JP); Masahiro Takazawa, Tokyo (JP); Hiroki Nagai, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/797,282

(22) Filed: Jul. 13, 2015

(65) Prior Publication Data

US 2015/0315342 A1 Nov. 5, 2015

Related U.S. Application Data

(63) Continuation of application No. PCT/JP2014/052302, filed on Jan. 31, 2014.

(30) Foreign Application Priority Data

Feb. 5, 2013 (JP) .................................. 2013-020696

(51) Int. Cl.
*C08J 3/12* (2006.01)
*C08F 114/26* (2006.01)
(Continued)

(52) U.S. Cl.
CPC ....... *C08J 3/12* (2013.01); *C08F 2/18* (2013.01); *C08F 6/22* (2013.01); *C08F 114/26* (2013.01);
(Continued)

(58) Field of Classification Search
USPC ............................................ 524/805; 526/206
See application file for complete search history.

(56) References Cited

U.S. PATENT DOCUMENTS

4,529,781 A * 7/1985 Cavanaugh ............. C08F 14/26
526/214
2002/0061956 A1 * 5/2002 Kobayashi ............... C08K 3/04
524/495

(Continued)

FOREIGN PATENT DOCUMENTS

CN 101511887 A * 8/2009 ............ C08F 214/26
EP 2 287 209 A1 2/2011
(Continued)

OTHER PUBLICATIONS

International Search Report issued Apr. 22, 2014, in PCT/JP2014/052302 filed Jan. 31, 2014.

(Continued)

*Primary Examiner* — Mark Kaucher
*Assistant Examiner* — Henry Hu
(74) *Attorney, Agent, or Firm* — Oblon, McClelland, Maier & Neustadt, L.L.P.

(57) ABSTRACT

To provide a process for producing a PTFE molding powder having a high bulk density from granular polymer particles without using an emulsifying agent having problems of bioaccumulation and toxicity. A process for producing a polytetrafluoroethylene molding powder, which comprises a step of suspension-polymerizing a monomer containing at least 99.8 mass % of tetrafluoroethylene in an aqueous medium to produce granular polymer particles and a step of milling the granular polymer particles, wherein the aqueous medium contains a compound represented by $R^F(OCF(X^1)CF_2)_{k-1}OCF(X^2)COO^-M^+$, at a concentration of from 0.5 to 2,000 ppm. $R^F$ is a perfluorinated $C_{1-10}$ monovalent organic (Continued)

group, $X^1$ and $X^2$ are fluorine atoms, etc., and $M^+$ is an ammonium ion or the like.

25 Claims, 1 Drawing Sheet

(51) Int. Cl.
    *C08F 2/18*     (2006.01)
    *C08L 27/18*     (2006.01)
    *C08F 6/22*     (2006.01)
    *C08K 5/098*     (2006.01)

(52) U.S. Cl.
    CPC ........... *C08L 27/18* (2013.01); *C08J 2327/18* (2013.01); *C08K 5/098* (2013.01)

(56) References Cited

U.S. PATENT DOCUMENTS

| | | | | |
|---|---|---|---|---|
| 2005/0010007 A1* | 1/2005 | Tsuji | ................... | C08J 3/12 526/250 |
| 2005/0182216 A1* | 8/2005 | Morgan | ................... | C08F 6/24 526/250 |
| 2006/0142468 A1* | 6/2006 | Downing | ................ | C08K 7/22 524/544 |
| 2007/0100077 A1* | 5/2007 | Lavanga | ................. | C08L 27/18 525/199 |
| 2009/0176952 A1* | 7/2009 | Funaki | .................. | C08F 214/26 526/206 |
| 2011/0021728 A1* | 1/2011 | Higuchi | .................... | C08F 2/22 526/247 |

FOREIGN PATENT DOCUMENTS

| | | |
|---|---|---|
| JP | 40-25911 | 11/1965 |
| JP | 49-14590 | 2/1974 |
| JP | 60-188408 | 9/1985 |
| JP | 62-34767 | 7/1987 |
| JP | 2002-317003 | 10/2002 |
| JP | 2006-509072 | 3/2006 |
| WO | WO 03/035724 | 5/2003 |
| WO | WO 2009/128432 | 10/2009 |

OTHER PUBLICATIONS

Hai-bing Yuan, et al., "Study Situation of Wet-granulated Polytetrafluoroethylene Resin" Journal of Synthetic Materials Aging and Application; College of Materials Science and Engineering South China University of Technology, 2007, pp. 44-47, 52.

* cited by examiner

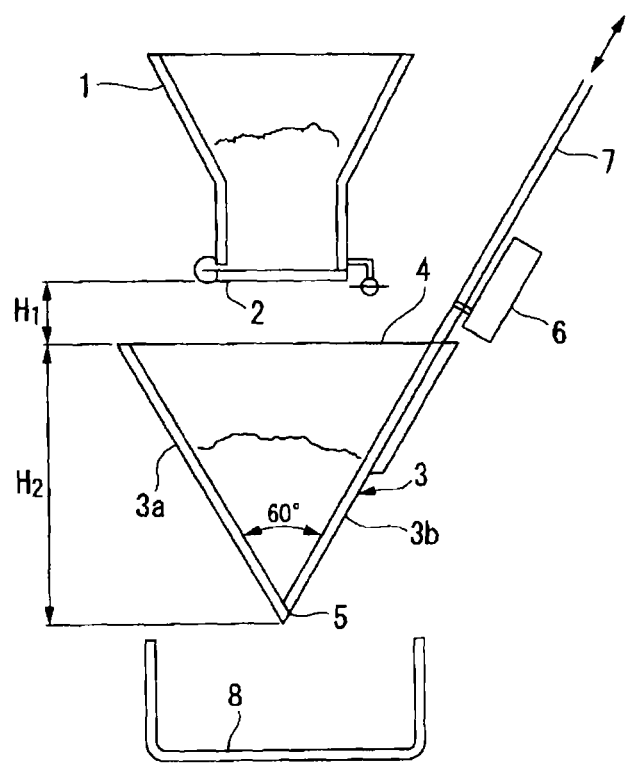

PROCESS FOR PRODUCING POLYTETRAFLUOROETHYLENE MOLDING POWDER AND PROCESS FOR PRODUCING POLYTETRAFLUOROETHYLENE AGGLOMERATED PRODUCT

TECHNICAL FIELD

The present invention relates to a process for producing a polytetrafluoroethylene molding powder and a process for producing an agglomerated product by agglomerating the polytetrafluoroethylene molding powder.

BACKGROUND ART

As a process for producing a polytetrafluoroethylene (hereinafter referred to also as "PTFE") by polymerizing tetrafluoroethylene (hereinafter referred to also as "TFE") in an aqueous medium, emulsion-polymerization and suspension-polymerization are available.

The emulsion-polymerization is usually carried out by using a fluorinated emulsifying agent together with a stabilizing agent such as a paraffin wax, a fluorine oil or a silicone oil under a mild stirring condition. In such a case, a sufficient amount of the fluorinated emulsifying agent is used so that PTFE particles to be formed would have a particle size of about 0.1 to 0.4 µm and would be stably dispersed in an aqueous medium. After the emulsion-polymerization, particles are coagulated so as to be a wet powder having a particle size of about a few hundreds µm, followed by drying the wet powder to obtain a powder so-called fine powder.

On the other hand, the suspension-polymerization is carried out under a severe stirring condition without using a stabilizing agent such as a paraffin wax, a fluorine oil and a silicone oil and usually without using a fluorinated emulsifying agent. PTFE obtained by the suspension-polymerization is granular polymer particles having mustache shape and a length of a few cm. Thus, such granular polymer particles are washed, followed by milling so as to have a particle size of about 1 to 100 µm to obtain a powder so-called molding powder.

The PTFE thus obtained has an extremely high melt viscosity, is non-melt moldable and thereby cannot be molded by a molding method employed for ordinal thermoplastic resins, for example, extrusion molding or injection molding.

Accordingly, in a case where a PTFE fine powder produced by the emulsion-polymerization is to be molded, a method is employed such that first, the fine powder is mixed with naphtha and preliminarily molded, and then an obtained paste is subjected to extrusion molding to obtain a molded product having a desired shape. The molded product may, for example, be an insulating coating material such as a tube, a hose or an electric cable. Further, by carrying out stretching treatment, a porous film for various applications can be obtained.

On the other hand, in a case where a PTFE molding powder produced by the suspension-polymerization is to be molded, first, the molding powder is packed in a mold at room temperature and compression molded, followed by heating to at least the melting point of the PTFE and sintering so as to obtain a molded product. Then, the molded product is subjected to machine processing such as cutting so as to process into a desired shape. The molded product may, for example, be an industrial member such as a gasket, a lining or an insulating film, or a tank which receives a strong acid or a strong alkali in the semiconductor industry.

As described above, as the polymerization method for producing PTFE, the emulsion-polymerization and the suspension-polymerization are usually employed, and an emulsifying agent is not usually used in the suspension-polymerization, however, a technique is disclosed such that a small amount of an emulsifying agent is used in the suspension-polymerization.

For example, Patent Documents 1 and 2 disclose techniques such that by using a very small amount of a specific fluorinated carboxylic acid type emulsifying agent such as ammonium perfluorooctanoate (hereinafter referred to also as "APFO"), it is possible to increase the specific surface area of granular polymer particles obtained by the suspension-polymerization.

Further, Patent Document 3 discloses a technique such that in the suspension-polymerization, by using a very small amount of a specific fluorinated sulfonic acid type emulsifying agent, it is possible to reduce buildup of granular polymer particles on the inside of a polymerization vessel.

PRIOR ART DOCUMENTS

Patent Documents

Patent Document 1: JP-B-S40-25911
Patent Document 2: JP-A-S60-188408
Patent Document 3: JP-B-S62-34767

DISCLOSURE OF INVENTION

Technical Problem

If the specific surface area of granular polymer particles obtained by the suspension-polymerization increases, the bulk density of a molding powder to be obtained by milling the granular polymer particles becomes high. Accordingly, the compression ratio at a time of packing and compressing the molding powder in a mold can be made small, and thereby the efficiency of molding such as improvement of the productivity of a molded product or downsizing of the mold can be expected.

Further, reducing buildup in a polymerization vessel leads to prevention of clogging of the production line, improvement of heat removal efficiency and increase of the recovery yield of granular polymer particles.

However, conventionally used perfluorocarboxylic acid type emulsifying agents such as APFO do not exist in nature and are hardly decomposable, and their biological accumulation is high. Further, the problem of toxicity of perfluorosulfonic acid type emulsifying agents has been raised. Thus, the tendency has been to restrict such emulsifying agents.

It is an object of the present invention to produce granular polymer particles by suspension-polymerization in the presence of a specific perfluoro-emulsifying agent which is free from problems of biological accumulation and toxicity and to produce a PTFE molding powder having a high bulk density by milling the granular polymer particles. Further, it is an object of the present invention to produce a PTFE agglomerated product by agglomerating the PTFE molding powder.

Solution to Problem

The present invention has the following constructions.
[1] A process for producing a polytetrafluoroethylene molding powder, which comprises a step of suspension-polymerizing a monomer containing at least 99.8 mass % of tetrafluoroethylene in an aqueous medium to produce granular polymer particles and a step of milling the granular polymer particles, wherein the aqueous medium contains a compound represented by the following formula (1) at a concentration of from 0.5 to 2,000 ppm:

$$R^F(OCF(X^1)CF_2)_{k-1}OCF(X^2)COO^-M^+ \quad (1)$$

wherein $R^F$ is a perfluorinated $C_{1-10}$ monovalent organic group, each of $X^1$ and $X^2$ which are independent of each other, is a fluorine atom or a trifluoromethyl group, k is an integer of at least 1, and $M^+$ is a hydrogen ion, an ammonium ion, an alkyl-substituted ammonium ion or an alkali metal ion.

[2] The process for producing a polytetrafluoroethylene molding powder according to the above [1], wherein the concentration of the compound represented by the formula (1) in the aqueous medium is from 0.5 to 50 ppm.

[3] The process for producing a polytetrafluoroethylene molding powder according to the above [1], wherein the concentration of the compound represented by the formula (1) in the aqueous medium is from 100 to 2,000 ppm.

[4] The process for producing a polytetrafluoroethylene molding powder according to any one of the above [1] to [3], wherein the polytetrafluoroethylene molding powder has an average particle size of from 20 to 60 μm.

[5] The process for producing a polytetrafluoroethylene molding powder according to any one of the above [1] to [4], wherein $R^F$ in the formula (1) is —$CF_2CF_3$ or —$CF_2CF_2CF_3$.

[6] The process for producing a polytetrafluoroethylene molding powder according to any one of the above [1] to [5], wherein both $X^1$ and $X^2$ in the formula (1) are fluorine atoms.

[7] The process for producing a polytetrafluoroethylene molding powder according to any one of the above [1] to [6], wherein k in the formula (1) is 2 or 3.

[8] The process for producing a polytetrafluoroethylene molding powder according to any one of the above [1] to [7], wherein the compound represented by the formula (1) is a compound represented by the following formula (1-3):

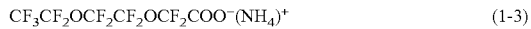

$$CF_3CF_2OCF_2CF_2OCF_2COO^-(NH_4)^+ \quad (1-3)$$

[9] The process for producing a polytetrafluoroethylene molding powder according to any one of the above [1] to [8], wherein the aqueous medium has a pH of from 8 to 10.

[10] The process for producing a polytetrafluoroethylene molding powder according to any one of the above [1] to [9], wherein the step of milling the granular polymer particles is carried out by means of a cutter mill and/or a jet mill.

[11] The process for producing a polytetrafluoroethylene molding powder according to any one of the above [1] to [10], wherein the polytetrafluoroethylene molding powder has a bulk density of from 0.35 to 0.50 g/mL.

[12] A process for producing a polytetrafluoroethylene agglomerated product, which comprises a step of agglomerating the polytetrafluoroethylene molding powder produced by the process as defined in any one of the above [1] to [11].

[13] The process for producing a polytetrafluoroethylene agglomerated product according to the above [12], wherein the step of agglomerating the polytetrafluoroethylene molding powder is carried out by a wet agglomeration method in a two phase liquid medium comprising water and an organic medium.

[14] The process for producing a polytetrafluoroethylene agglomerated product according to the above [12] or [13], wherein the polytetrafluoroethylene agglomerated product has an average particle size of from 300 to 500 μm.

Advantageous Effects of Invention

According to the production process of the present invention, granular polymer particles can be produced by suspension-polymerization without using an emulsifying agent having biological accumulation property, toxicity, etc. Further, by milling the granular polymer particles, a PTFE molding powder having a high bulk density which is free from problems such as biological accumulation and toxicity, can be produced. Further, according to the production process of the present invention, by agglomerating the PTFE molding powder, a PTFE agglomerated product which is free from problems such as biological accumulation and toxicity can be produced.

BRIEF DESCRIPTION OF DRAWING

FIG. 1 is an explanatory drawing to explain a method for evaluating powder-flowability of an agglomerated product.

DESCRIPTION OF EMBODIMENTS

[Process for Producing a PTFE Molding Powder]

The process for producing a PTFE molding powder of the present invention has a step of suspension-polymerizing a monomer containing at least 99.8 mass % of TFE in an aqueous medium to produce granular polymer particles (hereinafter referred to also as "suspension-polymerization step") and a step of milling the granular polymer particles obtained in said step (hereinafter referred to also as "milling step").

Here, "PTFE molding powder" produced in the present invention is one which is not heated at at least its melting point after the suspension-polymerization step.

(Suspension-Polymerization Step)

In the suspension-polymerization step of the present invention, a monomer containing at least 99.8 mass % of TFE is polymerized. A PTFE produced from a monomer containing at least 99.8 mass % of TFE has a very high melt viscosity and has a non-melt moldability such that the PTFE cannot be molded by molding methods for ordinary thermoplastic resins such as extrusion molding or injection molding. Thus, although described in detail later, in a case where a PTFE molding powder obtained by the production process of the present invention is to be molded, a method or the like is employed such that as the case requires, the PTFE molding powder is agglomerated to an agglomerated product, and then the agglomerated product is packed and compression-molded in a mold, followed by heating to temperature of at least a melting point of the PTFE for sintering.

In 100 mass % of the monomer, a monomer (comonomer) other than TFE may be contained within the range of at most 0.2 mass %. The monomer other than TFE may, for example, be a perfluoro(alkyl vinyl ether) (PFAVE), a perfluoro(2,2-dimethyl-1,3-dioxole), a perfluoro(4-methoxy-1,3-dioxole), a chlorotrifluoroethylene or a perfluoroalkylethylene. As the monomer other than TFE, one or more types may be used. By using the monomer other than TFE within the range of at most 0.2 mass %, the crystallization of PTFE can be suppressed to a certain degree, and the tensile strength, tensile elongation electric breakdown resistance, creep resistance, etc. of the PTFE will be improved.

In the suspension-polymerization step, the above monomer is suspension-polymerized in an aqueous medium containing a compound represented by the following formula (1) (hereinafter referred to also as "compound (1)") as an emulsifying agent at a concentration of from 0.5 to 2,000 ppm.

$$R^F(OCF(X^1)CF_2)_{k-1}OCF(X^2)COO^-M^+ \quad (1)$$

In the formula, $R^F$ is a perfluorinated $C_{1-10}$ monovalent organic group, each of $X^1$ and $X^2$ which are independent of each other is a fluorine atom or a trifluoromethyl group, and k is an integer of at least 1. $M^+$ is a hydrogen ion, an ammonium ion, an alkyl-substituted ammonium ion or an alkali metal ion.

The compound represented by the above formula (1) is free from problems such as biological accumulation and toxicity.

The $C_{1-10}$ perfluorinated monovalent organic group may, for example, be a $C_{1-10}$ perfluoroalkyl group or a $C_{2-10}$ perfluoroalkyl group having an etheric oxygen atom.

The carbon number of $R^F$ is preferably from 1 to 5, more preferably from 2 to 4, further preferably 2 or 3.

$R^F$ may be linear, branched or a ring. $R^F$ is preferably linear, since the surface tension-lowering property is thereby excellent.

Specifically, $R^F$ may, for example, be a perfluoroalkyl group such as —$CF_3$, —$CF_2CF_3$, —$CF_2CF_2CF_3$, —$CF_2CF_2CF_2CF_3$, —$CF(CF_3)_2$, —$CF_2CF(CF_3)_2$, —$CF(CF_3)CF_2CF_3$ or —$C(CF_3)_3$; or a perfluoroalkyl group having an etheric oxygen atom such as —$CF(CF_3)[OCF_2CF(CF_3)]_bOCF_2CF_2CF_3$ (b is an integer of at least 1, preferably an integer of from 1 to 5) or —$(CF_2)_dOCF_3$ (d is an integer of at least 1, preferably an integer of from 1 to 8). $R^F$ is particularly preferably —$CF_2CF_3$ or —$CF_2CF_2CF_3$.

Each of $X^1$ and $X^2$ which are independent of each other is a fluorine atom or a trifluoromethyl group. In the present invention, $X^1$ and $X^2$ are preferably the same, and both $X^1$ and $X^2$ are particularly preferably fluorine atoms.

k is an integer of at least 1, preferably an integer of from 1 to 6, more preferably an integer of from 1 to 4, further preferably 2 or 3.

$M^+$ is a hydrogen ion, an ammonium ion, an alkyl-substituted ammonium ion or an alkali metal ion, and specifically, $H^+$, $Li^+$, $Na^+$, $K^+$ or $NH_4^+$ may, for example, be mentioned. Among them, $M^+$ or $NH_4^+$ is preferred, since the solubility of the compound (1) in water is thereby excellent, and the compound (1) has no metal ion, whereby metal ions will not remain as impurities in a PTFE molding powder.

The total carbon number of the compound (1) is preferably from 5 to 10, more preferably from 5 to 8, further preferably from 5 to 6.

As specific preferred examples of the compound (1), the following compounds (1-1) to (1-7) may be mentioned.

$$CF_3OCF_2CF_2OCF_2COO^-(NH_4)^+ \quad (1-1)$$

$$CF_3(OCF_2CF_2)_2OCF_2COO^-(NH_4)^+ \quad (1-2)$$

$$CF_3CF_2OCF_2CF_2OCF_2COO^-(NH_4)^+ \quad (1-3)$$

$$CF_3CF_2(OCF_2CF_2)_2OCF_2COO^-(NH_4)^+ \quad (1-4)$$

$$CF_3CF_2CF_2(OCF_2CF_2)_2OCF_2COO^-(NH_4)^+ \quad (1-5)$$

$$CF_3CF_2CF_2OCF_2CF_2OCF_2COO^-(NH_4)^+ \quad (1-6)$$

$$CF_3(CF_2)_3OCF_2CF_2OCF_2COO^-(NH_4)^+ \quad (1-7)$$

Among them, the compound (1-3) is preferred, since the polymerization stability of PTFE is good.

The compound (1-3) can be obtained by fluorinating an ester of a corresponding non-fluorinated compound or a partially fluorinated compound by a conventional fluorination method such as a liquid phase fluorination method wherein reaction with fluorine is carried out in a liquid phase, a fluorination method employing fluorinated cobalt or an electrochemical fluorination method, followed by hydrolyzing an obtained fluorinated ester bond, purifying and then neutralizing with ammonia.

The concentration of the compound (1) in an aqueous medium in the suspension-polymerization step is from 0.5 to 2,000 ppm, preferably from 0.5 to 1,500 ppm, more preferably from 0.5 to 1,200 ppm.

When the concentration of the compound (1) is at least the lower limit of the above range, by milling granular polymer particles to be obtained by the suspension-polymerization step, a PTFE molding powder having a high bulk density can be produced. The PTFE molding powder having a high bulk density is excellent in the molding efficiency such as improving the productivity of a molded product or downsizing a mold, since the compression ratio at a time of packing and compressing the molding powder in a mold is made to be small. Further, in the case of the PTFE molding powder having a high bulk density, entrained air at the time of compression molding is little, whereby the deaeration property is excellent, and the fusion property among particles is good. Accordingly, an insulating film (skived film) obtained by compression molding a PTFE molding powder and sintering it to obtain a molded product for a skived film and spirally stripping the molded product, is uniform, excellent in an insulating property and excellent in breakdown voltage. Further, an agglomerated product having a high bulk density can be easily produced.

On the other hand, when the concentration of the compound (1) is at most the upper limit of the above range, the residual amount of the compound (1) in granular polymer particles to be obtained in the suspension-polymerization step can be reduced, the coloration of PTFE can be maintained in good condition, and the cost of the compound (1) itself and the recovery cost for the compound (1) can be reduced.

The concentration of the compound (1) in an aqueous medium can be preferably controlled within the above range depending on applications of PTFE.

For example, the concentration of the compound (1) in an aqueous medium is preferably from 0.5 to 50 ppm, further preferably from 0.5 to 30 ppm, more preferably from 0.5 to 10 ppm, in a case where a PTFE molding powder obtained by the production process of the present invention is preferably agglomerated, followed by compression molding and sintering to produce an industrial member such as a gasket or a lining; a tank which receives a strong acid or a strong alkali in the semiconductor industry; or a molded product for shaving processing to cut out a mainly a stereoshape product such as a wafer carrier. When the concentration of the compound (1) is at most the upper limit of the above range, the effect to improve the bulk density by agglomeration is superior, and the compression ratio at the time of packing an obtained molding powder in a mold and compressing is made to be smaller. Further, a mold may be downsized. When the concentration of the compound (1) is at least the lower limit of the above range, the addition effects of the compound (1) can be obtained.

On the other hand, in a case where a PTFE molding powder obtained by the production process of the present invention is compression molded and sintered to produce a molded product for a skived film, the concentration of the compound (1) in an aqueous medium is preferably from 100 to 2,000 ppm, more preferably from 100 to 1,200 ppm, most preferably from 100 to 1,000 ppm. When the concentration of the compound (1) is at least the lower limit of the above range, a molding powder having a higher bulk density and of which processability is excellent can be obtained, whereby a uniform insulating film can be easily obtained. Further, when the concentration is at most the upper limit of the above range, the residual amount of the compound (1) in granular polymer particles obtained in the suspension-polymerization step can be suppressed, the coloration of PTFE can be maintained in good condition, and the cost for the compound (1) itself and the recovery cost for the compound (1) can be reduced.

In the suspension-polymerization step, a monomer is suspension-polymerized in an aqueous medium in the presence of the compound (1) and a radical polymerization initiator under an inert gas atmosphere. Specifically, for example, the compound (1) and water are charged in a polymerization vessel such as an autoclave, the polymerization vessel is deaerated, and then an inert gas is introduced in the polymerization vessel. Then, a gaseous monomer mixture is introduced in the polymerization vessel, and an aqueous solution of a radical polymerization initiator is injected to initiate the reaction. The reaction is carried out under stirring. As the reaction proceeds, the monomer is consumed, and thereby the pressure in the system becomes low. Thus, in order to maintain the pressure in the system to be constant, the polymerization reaction is carried out while continuously introducing the monomer. After introducing the predetermined amount of the monomer, the reaction is terminated, and the monomer is discharged to the outside of the polymerization vessel from the inside of the polymerization vessel.

The polymerization temperature in the suspension-polymerization step is preferably from 10 to 90° C., more preferably from 60 to 90° C.

The polymerization pressure in the suspension-polymerization step is preferably maintained at from 0.5 to 2.0 MPa by the monomer and the inert gas, more preferably from 0.5 to 1.5 MPa. Within the above range, the balance between the polymerization rate and heat removal is excellent, and the productivity is excellent. At the initial stage of the polymerization, the partial pressure of the monomer is preferably from 40 to 90 vol %, more preferably from 50 to 80 vol %. Further, the inert gas is a gaseous substance inert to the monomer and substances which are present in the reaction system. By carrying out the suspension-polymerization under the inert gas atmosphere, it is possible to let the reaction proceed, while appropriately controlling the reaction rate. Within this range, the balance between the safety and the productivity is excellent. As the inert gas, helium, carbon dioxide or nitrogen may be mentioned, and nitrogen is preferred from the viewpoint of industrial availability.

The polymerization time in the suspension-polymerization step is preferably from 40 to 200 minutes, more preferably from 60 to 180 minutes. Within this range, the productivity is excellent.

As the radical polymerization initiator, a persulfate such as ammonium persulfate or an alkali metal persulfate or an ionic radical initiator such as a permanganate may be mentioned. Further, such a radical polymerization initiator as an oxidizing component may be combined with a reducing component such as hydrazine, diimine, iron (II) sulfate or an oxalate to form an oxidation-reduction initiator. In the case of the combination for such an oxidation-reduction initiator, it is preferred that either one is preliminarily charged in a polymerization vessel, and then while carrying out polymerization, the other is intermittently or continuously added.

The amount of the radical polymerization initiator to be used is adjusted so that the reaction rate would be properly controlled. For example, in the case of ammonium persulfate, the amount of the radical polymerization initiator is preferably from 1 to 100 ppm, more preferably from 1 to 50 ppm, most preferably from 1 to 10 ppm per the aqueous medium. When the amount of the ammonium persulfate to be used is at most the upper limit of the above range, ammonium persulfate can be suppressed from remaining in granular polymer particles to be obtained in the suspension-polymerization step, and the coloration of PTFE can be properly maintained. On the other hand, when the amount of ammonium persulfate to be used is at least the lower limit of the above range, a sufficient reaction rate can be obtained, whereby the productivity can be properly maintained, and granular polymer particles can be prevented from building up to the inside of the polymerization vessel due to too long reaction time.

The pH of the aqueous medium in the suspension-polymerization step is preferably in an alkali side of higher than 7. If the pH is in an acidic side of less than 7, PTFE may be colored due to elution of metal ions in a polymerization vessel, formation of hydrofluoric acid or the like. Further, when the pH is in the alkali side, the reaction rate can be controlled, and the heat removal during polymerization reaction can be properly carried out.

A buffer can be used to maintain the pH in the alkali side. The buffer may, for example, be ammonium biborate, ammonium carbonate, ammonium bicarbonate or ammonium hydroxide. The pH during the polymerization is preferably controlled to from 8 to 10, more preferably from 8.5 to 9.5.

In a case of an ordinary suspension-polymerization which is conventionally carried out without using the compound (1), granular polymer particles to be obtained are stiff and have mustache shape, while granular polymer particles to be obtained in the suspension-polymerization step of the present invention become particles which are close to spheres having no angularity, when the amount of compound (1) to be used is increased. The reason is considered to be such that by using the compound (1), at the initial stage of the polymerization in the suspension-polymerization step, dispersed fine particles (polymer particles) which are submicron order similar to particles observed in an emulsion-polymerization are formed, and along the progress of the polymerization, the dispersed particles aggregate, whereby the above described particles which are similar to spheres are formed.

(Milling Step)

In the milling step, after washing granular polymer particles produced in the suspension-polymerization step, for example, the granular polymer particles are milled by a mill such as a cutter mill, a hammer mill, a pin mill or a jet mill. Thus, a PTFE molding powder can be obtained.

In the milling step, plural mills may be combined for use. For example, a cutter mill which is a crude mill having a sharp rotary blade and a fixed blade for continuously carrying out shearing milling, and which is used for milling a fibrous material, a ductile material, etc. in many cases and a jet mill which is excellent in that the increase in temperature due to milling is relatively small and contamination is little may be combined. In such a case, first, granular polymer particles obtained in the suspension-polymerization step are milled to, for example, a particle size of from 100 to 1,000 μm by using a cutter mill and water or the like as a medium. Then, such crude milled particles are discharged through a mesh screen and dried by a method of heating to 50 to 150° C. or a method using an air jet, followed by supplying to a jet mill provided with a classifier. In the jet mill, high-pressure air is ejected and crashed to polymers as ultrahigh speed jet by spraying high-pressure air from a nozzle so that the polymers would be crushed one another, whereby the polymers are finely milled to for example, an average particle size of from 1 to 100 μm.

The PTFE molding powder thus obtained is a polymer obtained by polymerizing a monomer containing at least 99.8 mass % of TFE and cannot be melt-molded unlike thermoplastic resins and heat-melt resins. Accordingly, in a case where such a PTFE molding powder is molded, a method is employed that as the case requires, the PTFE molding powder is agglomerated by the after-mentioned method, and then packed in a mold and compression-molded, followed by sintering by heating to a temperature of at least a melting point of the PTFE to form a molded product. Thus, the PTFE molding powder is required to have a higher packing density in a mold, namely, a higher bulk density, from the viewpoint of the productivity and the downsizing of a mold.

In general, the surface of a PTFE molding powder gets rough due to milling and becomes irregular shape. Thus, spaces are formed among particles of the PTFE molding powder one another, and the smaller the particles size is, the relatively higher the space ratio is, whereby it tends to be difficult to densely pack the PTFE molding powder, and the molding efficiency tends to be low. On the other hand, if the particle size of the PTFE molding powder becomes large, the dielectric breakdown voltage which is an index of the insulating property, the tensile strength and the elongation of an insulating film formed by spirally stripping a molded product obtainable from the PTFE molding powder tend to deteriorate. Thus, considering these points, the average particle size of the PTFE molding powder obtained in the milling step is preferably from 1 to 100 μm, more preferably from 10 to 80 μm, further preferably from 20 to 60 μm.

When the average particle size of the PTFE molding powder falls within the above range, the bulk density of the PTFE molding powder is preferably from 0.35 to 0.50 g/mL, more preferably from 0.35 to 0.45 g/mL, whereby the molding efficiency is excellent. Further, the dielectric breakdown voltage, the tensile strength and the elongation percentage of an insulating film obtained by spirally stripping a molded product are excellent.

Further, the specific surface area of the PTFE molding powder is preferably from 1.0 to 5.0 m²/g, more preferably from 1.5 to 4.0 m²/g. Within this range, the powder bulk density is high, and the tensile strength elongation are excellent.

The PTFE molding powder thus obtained may be used as it is for producing a molded product, or as described below, the PTFE molding powder may be used for producing a molded product after agglomeration in order to improve the flowability and the bulk density.

In a case where a molded product for a skive film is produced by using a PTFE molding powder as it is without agglomerating, and the molded product for a skive film is spirally stripped to obtain an insulating film, such an insulating film has good fusion property among particles and excellent insulating property. Accordingly, in a case where an insulating film is produced, a molded product for a skive film is preferably produced without agglomerating a PTFE molding powder.

Further, the PTFE molding powder of the present invention may be irradiated with electron beam or γ-ray, heated under high humidity or subjected to another treatment, to form a low molecular weight powder. Such a low molecular weight powder is used as it is or as a case requires, milled to an average particle size of from about 1 to 20 μm, whereby a low molecular weight PTFE powder, so called lubricant is formed. Such a lubricant is used as an additive for a plastic, a rubber, a coating material, an ink, a grease, etc. in order to reduce frictional resistance on a surface, improve non-adhesive property or impart water repellency.

[Process for Producing a Polytetrafluoroethylene Agglomerated Product]

After milling the PTFE molding powder produced by the process for producing the PTFE molding powder of the present invention in the milling step, the PTFE molding powder has an irregular shape and thereby has insufficient flowability. Accordingly, in order to improve the flowability and further improve the bulk density, the PTFE molding powder is preferably agglomerated into a PTFE agglomerated product. The higher the bulk density of the PTFE molding powder to be agglomerated is, the higher the bulk density of a PTFE agglomerated product to be obtained by agglomeration tends to be.

The average particle size of the PTFE molding powder to be agglomerated is preferably from 20 to 60 μm, more preferably from 20 to 50 μm, most preferably from 20 to 40 μm. When the average particle size falls within the above range, the bulk density of a PTFE molding powder agglomerated product to be obtained becomes sufficiently high. Thus, few voids remain in a molded product to be obtained, and the uniformity of a molded product improves.

The agglomeration method is preferably a wet agglomeration wherein a PTFE molding powder is wetted with a liquid such as water or an organic solvent, followed by drying the liquid for agglomeration. As the wet agglomeration, specifically (i) a method using only an organic medium as a medium; (ii) a method utilizing dispersion in water; (iii) a method of carrying out in a two phase liquid medium of water and an organic medium; etc. are available. From the viewpoint of the bulk density and the specific gravity of a PTFE agglomerated product to be obtained, the method (iii) wherein agglomeration is carried out in a two phase liquid medium is preferred.

The organic solvent is preferably a fluorine type organic solvent which is not dissolved in water and has a surface tension of at most 25 dyne/cm at 25° C. and a boiling point of from 30 to 100° C. When the surface tension falls within the above range, the PTFE molding powder can be sufficiently wetted. When the boiling point falls within the above range, the temperature at a time of vaporizing an organic solvent for recovery can be lowered, whereby a soft PTFE molding powder can be obtained.

As specific examples of the organic solvent, a hydrofluorocarbon (hereinafter referred to also as "HFC"), a (polyfluoroalkyl)alkyl ether (hereinafter referred to also as "PFAE"), a hydrofluoroakyl ether (hereinafter referred to also as "HFE"), etc. may be mentioned.

The carbon number of HFC is from 4 to 10 (provided that 1≤the number of hydrogen≤the number of fluorine). When the carbon number falls within the above range, the boiling point of an organic solvent is appropriate, and a PTFE agglomerated product having an appropriate softness can be efficiently obtained. The boiling point of HFC is preferably from 40 to 130° C.

The HFC has hydrogen atoms and thereby has a small global warming coefficient. Further, the HFC has more hydrogen atoms than fluorine atoms, whereby the surface tension is small, and a PTFE molding powder can be sufficiently wetted.

As specific examples of HFC, $C_4H_2F_8$ (for example $H(CF_2)_4H$), $C_4H_4F_6$ (for example $F(CHF)_4F$), $C_4H_5F_5$ (for example $CF_3CH_2CF_2CH_3$), $C_5HF_{11}$ (for example $(CF_3)_2CFCF_2CF_2H$), $C_5H_2F_{10}$ (for example $CF_3CF(CHF_2)CF_2CHF_2$), $C_6HF_{13}$ (for example $H(CF_2)_6F$), $C_6H_5F_9$ (for example $F(CF_2)_4CH_2CH_3$), $C_7HF_{15}$, $C_8HF_{17}$ (for example $H(CF_2)_8F$), $C_9HF_{19}$ and 1,1,2,2,3,3,4,4,5,6-decafluorocyclohexane, 1,1,2,2,3,3,4,5,5,6-decafluorocyclohexane and 1-trifluoromethyl-1,2,2,3,3,4,4,5,5,6-decafluorocyclohexane, etc. may be mentioned. At least one HFC selected from the group consisting of the above is preferred.

PFAE is represented by the following formula (2).

$$R^1\text{—}O\text{—}R^2 \quad (2)$$

wherein $R^1$ is a $C_{2-6}$ polyfluoroalkyl group, and $R^2$ is a $C_{1-2}$ alkyl group. The range of the boiling point of PFAE is preferably from 25 to 80° C.

$R^1$ is preferably a perfluoroalkyl group. $R^1$ may have a linear structure or a branched structure.

As specific examples of PFAE, $CF_3CF_2CF_2CF_2OCH_3$, $CF_3CF_2CF_2CF_2OCH_2CH_3$, $CF_3CF_2CF_2OCH_3$, $(CF_3)_2CFOCH_3$, etc. may be mentioned. At least one type of PFAE selected from the group consisting of the above is preferred.

HFE is represented by the following formula (3).

$$Ra\text{-}O\text{-}Rb \quad (3)$$

wherein Ra and Rb are polyfluoroalkyl groups, at least one of Ra and Rb has a hydrogen atom, and the total of carbon atoms of Ra and Rb is from 3 to 8.

The boiling point of HFE is preferably from 25 to 60° C., more preferably from 40 to 60° C., further preferably from 45 to 60° C. When the boiling point of HFE is at most the upper limit of the above range, it is not necessary to excessively raise the temperature at a time of removing HFE from a PTFE agglomerated product. Thus, the inside of a PTFE agglomerated product is free from hardening, and the tensile strength and the elongation percentage of a molded product to be obtained can be properly maintained. On the other hand, when the boiling point of HFE is at least the lower limit of the above range, a PTFE molding powder sufficiently aggregates, and a PTFE agglomerated product to be obtained is excellent in the strength and is difficult to be broken by external force.

As specific examples of HFE, $CF_3CH_2OCF_2CHF_2$ (boiling point: 56° C.), $CF_3CF_2CH_2OCHF_2$ (boiling point: 46° C.), etc. may be mentioned. At least one type of HFE of the above is preferred.

In the agglomeration method (iii), the proportion of water/organic solvent/molding powder is preferably the range of 2 to 20/0.2 to 2/1 in mass ratio.

Further, at the time of agglomeration, a PTFE composition wherein optional components such as a powdery filler such as glass fiber, carbon fiber, bronze or graphite; another melt-moldable fluorinated resin; or a heat resistant resin are blended in a PTFE molding powder may be agglomerated. In such a case, a PTFE molding powder and optional components such as a filler or a fluorinated resin are uniformly mixed by a drying method to prepare a PTFE composition, and the PTFE composition is mixed under stirring in a medium such as a two phase liquid medium.

In a case where a filler is blended, a colloid dispersion obtained by emulsion polymerizing a PTFE having an average particle size of from 0.1 to 0.5 μm may be blended. It is effective to blend the PTFE colloid dispersion particularly in a case where the blended proportion of a filler is large.

The amount of the PTFE colloid dispersion to be blended is preferably from 1 to 5 parts by mass as solid content conversion of PTFE, per 100 parts by mass of the PTFE molding powder to be used for agglomeration.

The heat resistant resin may, for example, be a polyimide, a polyether imide, a polyamide imide, a polyether ether ketone or a polyphenylene sulfite.

The average particle size of the PTFE agglomerated product is preferably from 300 to 500 μm, more preferably from 350 to 500 μm. The average particle size of the PTFE agglomerated product is preferably at least 5 times the average particle size of the PTFE molding powder. Within this range, when the PTFE agglomerated product is stored, it is excellent in preventing the PTFE agglomerated product from lumping. Further, the bulk density of the PTFE agglomerated product is preferably from 0.80 to 1.00 g/mL, more preferably from 0.80 to 0.95 g/mL. Within this range, the mold-packing property of the PTFE agglomerated product is excellent. Further, the powder flowability measured by the measuring method of the after-mentioned "(G) powder flowability of agglomerated product" is preferably from 5 to 15 mm, more preferably from 5 to 10 mm. Within this range, the productivity of the PTFE agglomerated product in automolding is excellent.

The PTFE agglomerated product has a high bulk density, is excellent in the flowability and is relatively soft, whereby the pressure transferability at the time of compression molding is good. Accordingly, by using the PTFE agglomerated product, the molding efficiency of a time of producing a molded product is improved. Further, an obtained molded product is excellent in the tensile strength and the elongation percentage and is dense such that the steam penetration would be small.

[Polytetrafluoroethylene Molded Product]

The PTFE molding powder and the PTFE agglomerated product produced by the production process of the present invention have a high melt viscosity at a level of $10^{10}$ to $10^{12}$ Pa·s at even 380° C. and thereby cannot be molded by ordinary molding methods i.e. extrusion molding and injection molding for a thermoplastic resin.

Accordingly, in a case where a molded product is produced by using a PTFE molding powder or a PTFE agglomerated product, first, a PTFE molding powder or a PTFE agglomerated product is packed in a mold at room temperature, compress-molded at from 10 to 35 MPa and then sintered by heating to at least a melting point of the PTFE of from 360 to 390° C. in a sintering oven to prepare a molded product. Further, at the time of cooling the molded product, particularly in a case of a large size molded product, the rate of cooling is preferably small in order to prevent the molded product from being warped or cracked, and the temperature is carefully dropped by spending sufficient time.

Then, the obtained molded product is processed into a predetermined shape by mechanical processing such as cutting processing. The product to be obtained by mechanical processing may, for example, be a stereoshape product such as an industrial member such as a gasket or a lining, a tank which receives a strong acid or a strong alkali in semiconductor industrial or a wafer carrier; or a sheet shape product such as an insulating film.

EXAMPLES

Now, the present invention will be described in detail with reference to Examples, but is should be understood that the present invention is by no means restricted by such Examples.

Respective properties were measured by the following methods in Examples.

[Measuring Method]

(A) Average particle size of PTFE molding powder (unit: μm): The average particle size was measured by means of a laser scattering particle size distribution analyzer (tradename "LA-920" manufactured by HORIBA, LTD.) and using isopropyl alcohol as a developing solvent.

(B) Bulk density of PTFE molding powder (unit: g/mL): The bulk density was measured in accordance with JIS K6891. Into a stainless steel measuring cup having an inner volume of 100 mL, a sample was dropped from a funnel disposed at the top part, and the sample raised from the measuring cup was scrapped off with a flat plate, whereupon the mass of the sample remained in the measuring cup was divided by the inner volume of the measuring cup to obtain a value, which was taken as the bulk density of the sample.

(C) Standard specific gravity (hereinafter referred to also as "SSG") of PTFE molding powder: SSG was measured in accordance with ASTM D4894-98a. 12.0 g of a sample was weighed and held for two minutes under 34.5 MPa in a cylindrical mold having an inner diameter of 28.6 mm. This was put in an oven of 290° C. and heated at a rate of 120° C./hr. After being held at 380° C. for 30 minutes, it was cooled at a rate of 60° C./hr and held at 294° C. for 24 minutes. Then, it was held in a desiccator at 23° C. for 12 hours, and then, the specific gravity value of the molded product to water at 23° C., was measured and taken as the standard specific gravity.

Further, SSG is a value as an index of molecular weight of a PTFE molding powder. The higher the SSG is, the smaller the molecular weight is.

(D) Dielectric breakdown voltage (unit: kV/0.1 mm) of film: PTFE molding powder was packed in a mold and compression-molded at 25° C. at 15.7 MPa, followed by sintering by heating at 370° C. for 4 hours to obtain a molded product (fired column block). Then, the molded product was subjected to the dielectric breakdown voltage test in accordance with JIS K6891. That is, a skived film having a thickness of 0.1 mm was obtained by spirally cutting a molded product. The skived film was sandwiched between electrodes, and voltage was constantly raised from 0 V at a rate of 1 kV/s in air to measure breakdown voltage (kV/0.1 mm).

(E) Average particle size (unit: μm) of agglomerated product: The average particle size was measured in accordance with JIS K6891. Sequentially from the top, 20, 30, 40, 45 and 60 mesh standard sieves were stacked, and a sample was put on the 20 mesh sieve and sieved, whereupon the mass of the sample remained in each sieve was obtained. Based on the mass, a 50% particle size was calculated by log probability paper and taken as the average particle size.

(F) Bulk density (unit: g/mL) of agglomerated product: The bulk density was measured by the same method as the above (B).

(G) Powder flowability (unit: mm) of agglomerated product: The powder flowability is measured by means of a device illustrated in FIG. 1 in a measuring room controlled at 25±2° C. First, 100 g of a sample which is sieved out by a 9 mesh (opening of 2,000 μm) is put in a first hopper 1. By opening a bottom door 2 of the first hopper 1 at once, a second hopper 3 having an opening part 4 and disposed at a position having a distance $H_1$ (60 mm) from an opening part at the bottom of the first hopper 1 is filled with the sample.

The second hopper 3 has a height $H_2$ of 92 mm. The second hopper 3 has a first plate 3a inclined at 30° to the vertical direction and a second plate 3b inclined at 30° to the vertical direction in the direction opposite to the first plate 3a, and the angle between the first plate 3a and the second plate 3b is 60°. Further, the second hopper 3 has a front plate (not illustrated) and a back plate (not illustrated) arranged parallel to the front plate, the end part of the first plate 3a and the second plate 3b at the front side of the FIGURE is closed by the front plate, and the end part of the first plate 3a and the second plate 3b at the back side of the FIGURE is closed by a back plate. Further, the second plate 3b is moveable, and the second plate 3b can be moved by moving a connection bar 7 connected to the second plate 3b to the directions indicated by the arrow in the FIGURE. Specifically, by moving the connection bar 7 upward along the arrow in the FIGURE, the second plate 3b is moved, whereby a slit part 5 at the bottom of the second hopper 3 is opened.

After filling the second hopper 3 with the sample, the connection bar 7 is moved upward along the arrow at a rate of 12 mm/min to open the slit part 5 of the second hopper 3, and thereby the sample was dropped to a recovery vessel 8. Then, when 50 g of the sample was dropped to the recovery vessel 8, a value (spread of the opening part) displayed on a scale 6 which shows an opening width of the slit part 5 is measured. This value is an index of the powder flowability.

The smaller the value indicated on the scale 6 is, the better the powder flowability is.

Further, the opening part at the bottom of the first hopper 1 has a length of 58 mm in the horizontal direction in the FIGURE and a length of 22 mm in the inward direction in the FIGURE (58 mm×22 mm).

Further, the opening part 4 at the top end of the second hopper 3 has a length of 104 mm in the horizontal direction in the FIGURE and a length of 63 mm in the inward direction in FIGURE (104 mm×63 mm).

(H) Tensile strength (unit: MPa) and elongation percentage (unit: %) of molded product: The tensile strength and the elongation percentage were measured in accordance with JIS K6891. A sample was produced as described below. 1,700 g of agglomerated product was compression-molded at a pressure of 31.4 MPa and fired at 370° C. for 4 hours, followed by cooling at a cooling rate of 70° C./hr to obtain a sheet having a thickness of 2 mm. A sample was pouched out from the sheet by a dumbbell No. 3 type.

(I) Specific surface area: The specific surface area was measured by the BET method by means of a surface analyzer (S-1000, manufactured by Shibata Scientific Technology, Ltd.). Pure nitrogen gas (purity of at least 99.9995%) was used as a carrier gas, and cooling was carried out with liquid nitrogen.

Example 1

Into a 100 L stainless steel autoclave equipped with baffle plates and a stirrer having a shaft provided with two turbine blades arranged in the upper part and lower part, 234 mg of the above compound (1-3) and 63.1 L of deionized water were charged. The autoclave was deaerated, nitrogen was introduced until the pressure became 0.15 MPa, and while stirring at 150 rpm, the internal temperature was raised to 75° C. Nitrogen was continuously blown to a gas phase part for about 20 minutes to pressurize to 0.44 MPa. Then, TFE was introduced until the pressure was raised to 1.10 MPa, and while stirring at 500 rpm, 130 mg of ammonium persulfate dissolved in about 70° C. hot water and 2.23 g of ammonium carbonate were injected. After about 4 minutes, the internal pressure was dropped to 1.08 MPa. Then, while adding TFE so as to maintain the internal pressure of the autoclave at 1.13 MPa, the polymerization was carried out.

When the added amount of TFE reached 9.35 kg, the reaction was terminated, and TFE in the autoclave was released to the atmospheric air. The polymerization time was 77 minutes. The compound (1-3) was 3.6 ppm in water (aqueous medium) used in the polymerization.

The obtained granular PTFE (granular polymer particles) was dehydrated by a sieve and washed with deionized water.

The amount of the obtained granular PTFE built up in the polymerization vessel is shown in Table 1. Further, the amount of buildup is mass proportion of the buildup product based on 100 mass % of the total polymer amount, and the mass of the buildup product was obtained by scraping the buildup product in the polymerization vessel and measuring its mass.

Then, the granular PTFE was milled to a particle size of about several hundred micrometer by a cutter mill, and after drying at 150° C., and the granular PTFE was milled to an average particle size of 41 μm by a jet mill to obtain a PTFE molding powder.

The average particle size, the bulk density, the specific surface area and SSG of the obtained PTFE molding powder and the dielectric breakdown voltage of the film are shown in Table 1.

Example 2

The reaction was carried out in the same manner as in Example 1, except that the amount of the compound (1-3) to be used was changed to 325 mg. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Example 3

The reaction was carried out in the same manner as in Example 1, except that the amount of the compound (1-3) to be used was changed to 117 mg. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Example 4

The reaction was carried out in the same manner as in Example 1, except that the amount of the compound (1-3) to be used was changed to 59 mg. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Example 5

The reaction was carried out in the same manner as in Example 1, except that the amount of the compound (1-3) to be used was changed to 1.95 g. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Example 6

The autoclave used in Example 1 was deaerated, nitrogen was introduced until the pressure became 0.15 MPa, and while stirring at 150 rpm, the internal temperature was raised to 65° C.

Nitrogen was continuously blown to a gas phase part for about 20 minutes to pressurize to 0.44 MPa. Then, TFE was introduced until the pressure was raised to 1.10 MPa, and while stirring at 500 rpm, 9.79 g of the compound (1-3), 132 mg of ammonium persulfate and 9.77 g of ammonium carbonate were dissolved in about 70° C. hot water and injected. After about 7 minutes, the internal pressure was dropped to 1.08 MPa. Then, while adding TFE so as to maintain the internal pressure of the autoclave at 1.13 MPa, the polymerization was carried out.

When the added amount of TFE reached 16.18 kg, the reaction was terminated, and TFE in the autoclave was released to the atmospheric air. The polymerization time was 169 hours. The compound (1-3) was 150 ppm in water (aqueous medium) used in the polymerization.

The obtained granular PTFE (granular polymer particles) was dehydrated by a sieve and washed with deionized water.

The amount of the obtained granular PTFE built up in the polymerization vessel is shown in Table 1.

Then, the milling was carried out in the same manner as in Example 1 to obtain a PTFE molding powder.

The average particle size, the bulk density, the specific surface area and SSG of the obtained PTFE molding powder and the dielectric breakdown voltage of the film are shown in Table 1.

Example 7

The reaction was carried out in the same manner as in Example 6, except that the amount of the compound (1-3) to be used was changed to 14.7 g. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Example 8

The reaction was carried out in the same manner as in Example 6, except that the amount of the compound (1-3) to be used was changed to 78.3 g. Then, milling was carried out in the same manner as in Example 1.

The concentration of the compound (1-3) in water (aqueous medium) used in the polymerization, the total added amount of TFE, the polymerization time, the amount of the obtained granular PTFE built up in the polymerization vessel; the average particle size, the bulk density, the specific surface and SSG of the obtained PTFE molding powder; and the dielectric breakdown voltage of the film are shown in Table 1.

Comparative Example 1

Into the autoclave used in Example 1, 63.1 L of deionized water was charged. The autoclave was deaerated, nitrogen was introduced until the pressure became 0.11 MPa, and while stirring at 150 rpm, the internal temperature was raised to 78° C. Nitrogen was continuously blown to a gas phase part for about 20 minutes to pressurize to 0.13 MPa. Then, TFE was introduced until the pressure was raised to 0.85 MPa, and while stirring at 500 rpm, 51 mg of ammonium persulfate dissolved in about 70° C. hot water and 11.6 mL of ammonium water were injected. After about 2 minutes, the internal pressure was dropped to 0.83 MPa. Then, while adding TFE so as to maintain the internal pressure of the autoclave at 0.88 MPa, the polymerization was carried out. Along the progress of the polymerization, the internal temperature was dropped to 75° C. from 84° C.

When the added amount of TFE reached 9.35 kg, the reaction was terminated, and TFE in the autoclave was released to the atmospheric air. The polymerization time was 54 minutes.

The obtained granular PTFE (granular polymer particles) was dehydrated by a sieve and washed with deionized water.

The amount of the obtained granular PTFE built up in the polymerization vessel is shown in Table 1.

Then, the milling was carried out in the same manner as in Example 1 to obtain a PTFE molding powder.

The average particle size, the bulk density, the specific surface area and SSG of the obtained PTFE molding powder and the dielectric breakdown voltage of the film are shown in Table 1.

It is evident from Table 1 that when a granular PTFE obtained by suspension-polymerization using the compound (1-3) within the range of from 0.5 to 2,000 ppm in each Example, was milled, a PTFE molding powder having a high bulk density could be obtained. When a PTFE molding powder having a high bulk density is used, the compression ratio at a time of packing the molding powder in a mold and compressing the molding powder can be small, and the molding efficiency such as the improvement of the productivity of a molded product and downsizing of a mold is expected. Further, the PTFE molding powders of Examples 6 to 8 produced under a condition that the concentration of the compound (1-3) was relatively high had a higher bulk density.

Further, it is suggested that SSG of the PTFE molding powder obtained in Each Example is not too large, the molecular weight is considered to be proper, and thereby the strength, etc. of a molded product produced by molding the PTFE molding powder have no problem. Further, the insulating property of a film produced by using the PTFE molding powder obtained in each Example was good.

Example 9

Into a cylindrical agglomeration vessel (volume 135 L) made of stainless steel and equipped with four baffle plates having, at its center, a stirrer provided, at each of upper and lower positions, with six flat blades, 79 kg of water, 11.2 kg of an organic medium (boiling point: 55° C.) of the following formula (4) and 16.2 kg of a PTFE molding powder having an average particle size of 41 μm and a bulk density of 0.41 g/mL produced under the same condition as in Example 1 were added.

$$CF_3CHFCHFCF_2CF_3 \quad (4)$$

Then, the temperature in the vessel was controlled to 28° C., and stirring was continued at a frequency of rotation of 600 rpm for 45 minutes. Then, the frequency of rotation was changed to 340 rpm, and while raising the temperature in the vessel to the boiling point of the organic medium, stirring was carried out for 36 minutes. Then, the frequency of rotation was changed to 340 rpm, and while maintaining the temperature in the vessel at the boiling point of the organic medium, steam of the organic solvent was recovered by spending 10 minutes. Thus, a part of the used organic solvent was discharged from the agglomeration vessel. Then, the frequency of rotation was changed to 130 rpm, and under a state of maintaining the temperature in the vessel at the boiling point of the organic medium, the pressure in the

TABLE 1

| | | Ex. 1 | Ex. 2 | Ex. 3 | Ex. 4 | Ex. 5 | Ex. 6 | Ex. 7 | Ex. 8 | Comp. Ex. 1 |
|---|---|---|---|---|---|---|---|---|---|---|
| Suspension-polymerization step | Concentration of the compound (1-3) (ppm) | 3.6 | 5.0 | 1.8 | 0.9 | 30 | 150 | 225 | 1,200 | 0 |
| | Total added amount of TFE (kg) | 9.35 | 9.35 | 9.35 | 9.35 | 9.35 | 16.18 | 16.18 | 16.18 | 9.35 |
| | Polymerization time (min) | 77 | 84 | 100 | 104 | 75 | 169 | 166 | 148 | 54 |
| Granular polymer particles | The amount of buildup (mass %) | 3 | 4 | 6 | 3 | 9 | 4 | 2 | 1 | 1 |
| PTFE molding powder | Average particle size (μm) | 41 | 38 | 37 | 45 | 38 | 35 | 35 | 35 | 39 |
| | Bulk density (g/mL) | 0.41 | 0.42 | 0.42 | 0.43 | 0.42 | 0.45 | 0.45 | 0.45 | 0.34 |
| | Specific surface area (m²/g) | 2.0 | 2.2 | 1.9 | 1.9 | 3.1 | 1.6 | 1.7 | 1.7 | 1.9 |
| | SSG (—) | 2.167 | 2.166 | 2.168 | 2.168 | 2.162 | 2.157 | 2.160 | 2.159 | 2.152 |
| Film | Dielectric breakdown voltage (kV/0.1 mm) | 12.8 | 12.2 | 12.4 | 12.0 | 12.6 | 11.7 | 11.5 | 11.8 | 9.4 | vessel was reduced to 0.023 MPa (absolute pressure) by spending 10 minutes to evaporative-recover the organic medium.

The temperature in the vessel was cooled to room temperature, a slurry having an agglomerated product dispersed in water was recovered, and the agglomerated product was sieved by a mesh filter having openings of 200 μm. After the sieve, the agglomerated product was dried at 300° C. for 9 hours to obtain a PTFE agglomerated product.

The average particle size, the bulk density, the powder flowability of the obtained PTFE agglomerated product and the tensile strength and the elongation percentage of a molded product are shown in Table 2.

Example 10

A PTFE agglomerated product was produced in the same manner as in Example 9, except that a powder (average particle size of 35 μm and bulk density of 0.45 g/mL) produced under the condition of Example 7 was used as the PTFE molding powder used for the agglomeration, instead of the powder produced under the condition of Example 1.

The average particle size, the bulk density, the powder flowability of the obtained PTFE agglomerated product and the tensile strength and the elongation percentage of a molded product are shown in Table 2.

Comparative Example 2

A PTFE agglomerated product was produced in the same manner as in Example 9, except that a powder (average particle size of 39 μm and bulk density of 0.34 g/mL) produced under the condition of Comparative Example 1 was used as the PTFE molding powder used for the agglomeration, instead of the powder produced under the condition of Example 1.

The average particle size, the bulk density, the powder flowability of the obtained PTFE agglomerated product and the tensile strength and the elongation percentage of a molded product are shown in Table 2.

TABLE 2

| | | Ex. 9 | Ex. 10 | Comp. Ex. 2 |
|---|---|---|---|---|
| PTFE molding powder used for agglomeration | Average particle size (μm) | 41 (produced under the condition of Ex. 1) | 35 (produced under the condition of Ex. 7) | 39 (produced under the condition of Comp. Ex. 1) |
| | Bulk density (g/mL) | 0.41 | 0.45 | 0.34 |
| Obtained PTFE agglomerated product | Average particle size (μm) | 460 | 400 | 380 |
| | Bulk density (g/mL) | 0.84 | 0.82 | 0.78 |
| | Powder flowability (mm) | 8 | 8 | 7 |
| Mechanical properties of a molded product | Tensile strength (MPa) | 37.0 | 37.0 | 37.2 |
| | Elongation percentage (%) | 430 | 350 | 330 |

It is evident from Table 2 that PTFE agglomerated products having a high bulk density were obtained from the PTFE molding powders having a high bulk density which were produced under the condition of Example 1 or Example 7. Further, as is evident from comparing Example 9 and Example 10, the increase of the bulk density between before and after the agglomeration in Example 9 was larger, and the effect to improve the bulk density was superior, since the PTFE molding powder of Example 1 produced under the condition that the amount of the compound (1-3) to be used was small, was used in Example 9. Further, the powder flowability of the PTFE agglomerated products obtained in Example 9 and Example 10 was good, and molded products obtained from such agglomerated products were excellent in the tensile strength and the elongation percentage.

INDUSTRIAL APPLICABILITY

According to the present invention, by using an emulsifying agent having no bioaccumulation potential and no toxicity, granular polymer particles can be produced by suspension-polymerization, and by milling the granular polymer particles, a PTFE molding powder having a high bulk density can be produced. Further, by agglomerating the PTFE molding powder, a PTFE agglomerated product having a high bulk density can be produced.

The PTFE molding powder and the PTFE agglomerated product produced by the production process of the present invention are suitable to produce an industrial member such as a gasket, a lining or an insulating film; a tank which receives a strong acid or a strong alkali in semiconductor industries or a wafer carrier.

This application is a continuation of PCT Application No. PCT/JP2014/052302, filed on Jan. 31, 2014, which is based upon and claims the benefit of priority from Japanese Patent Application No. 2013-020696 filed on Feb. 5, 2013. The contents of those applications are incorporated herein by reference in their entireties.

REFERENCE SYMBOLS

1: First hopper
2: Bottom door
3: Second hopper
4: Opening part
5: Slit part
6: Scale
7: Connection bar
8: Container

What is claimed is:

1. A process for producing a polytetrafluoroethylene molding powder, which comprises:
suspension-polymerizing a monomer consisting of tetrafluoroethylene in an aqueous medium to produce granular polymer particles and
milling the granular polymer particles to form the polytetrafluoroethylene molding powder,
wherein the aqueous medium contains a compound represented by the following formula (1) at a concentration of from 0.5 to 2,000 ppm:

$$R^F(OCF(X^1)CF_2)_{k-1}OCF(X^2)COO^-M^+ \tag{1}$$

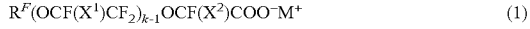

wherein $R^F$ is a perfluorinated $C_{1-10}$ monovalent organic group, each of $X^1$ and $X^2$ which are independent of each other, is a fluorine atom or a trifluoromethyl group, k is an integer of at least 1, and $M^+$ is a hydrogen ion, an ammonium ion, an alkyl-substituted ammonium ion or an alkali metal ion.

2. The process for producing a polytetrafluoroethylene molding powder according to claim 1, wherein the concentration of the compound represented by the formula (1) in the aqueous medium is from 0.5 to 50 ppm.

3. The process for producing a polytetrafluoroethylene molding powder according to claim 1, wherein the concentration of the compound represented by the formula (1) in the aqueous medium is from 100 to 2,000 ppm.

4. The process for producing a polytetrafluoroethylene molding powder according to claim 1, wherein the polytetrafluoroethylene molding powder has an average particle size of from 20 to 60 μm.

5. The process for producing a polytetrafluoroethylene molding powder according to claim 1, wherein $R^F$ in the formula (1) is —$CF_2CF_3$ or —$CF_2CF_2CF_3$.

6. The process for producing a polytetrafluoroethylene molding powder according to claim 1, wherein both $X^1$ and $X^2$ in the formula (1) are fluorine atoms.

7. The process for producing a polytetrafluoroethylene molding powder according to claim 1, wherein k in the formula (1) is 2 or 3.

8. The process for producing a polytetrafluoroethylene molding powder according to claim 1, wherein the compound represented by the formula (1) is a compound represented by the following formula (1-3):

$$CF_3CF_2OCF_2CF_2OCF_2COO^-(NH_4)^+ \quad (1\text{-}3),$$

9. The process for producing a polytetrafluoroethylene molding powder according to claim 1, wherein the aqueous medium has a pH of from 8 to 10.

10. The process for producing a polytetrafluoroethylene molding powder according to claim 1, wherein the step of milling the granular polymer particles is carried out by means of a cutter mill and/or a jet mill.

11. The process for producing a polytetrafluoroethylene molding powder according to claim 1, wherein the polytetrafluoroethylene molding powder has a bulk density of from 0.35 to 0.50 g/mL.

12. The process for producing a polytetrafluoroethylene molding powder according to claim 1, wherein the suspension-polymerizing is a homopolymerization of tetrafluoroethylene.

13. The process for producing a polytetrafluoroethylene molding powder according to claim 1, wherein the concentration of the compound represented by the formula (1) in the aqueous medium is from 150 to 1,200 ppm.

14. The process for producing a polytetrafluoroethylene molding powder according to claim 1, wherein the concentration of the compound represented by the formula (1) in the aqueous medium is from 0.9 to 30 ppm.

15. The process for producing a polytetrafluoroethylene molding powder according to claim 1, wherein the compound represented by the following formula (1) is at least one selected from the group consisting of $CF_3OCF_2CF_2OCF_2COO^-(NH_4)^+$, $CF_3(OCF_2CF_2)_2OCF_2COO^-(NH_4)^+$, $CF_3CF_2OCF_2CF_2OCF_2COO^-(NH_4)^+$, $CF_3CF_2(OCF_2CF_2)_2OCF_2COO^-(NH_4)^+$, $CF_3CF_2CF_2(OCF_2CF_2)_2OCF_2COO^-(NH_4)^+$, $CF_3CF_2CF_2OCF_2CF_2OCF_2COO^-(NH_4)^+$, and $CF_3(CF_2)_3OCF_2CF_2OCF_2COO^-(NH_4)^+$.

16. The process for producing a polytetrafluoroethylene molding powder according to claim 1, wherein the compound represented by the following formula (1) is $CF_3CF_2OCF_2CF_2OCF_2COO^-(NH_4)^+$.

17. The process for producing a polytetrafluoroethylene molding powder according to claim 1, wherein the polytetrafluoroethylene molding powder has a bulk density of from 0.41 to 0.45 g/mL according to JIS K6891.

18. The process for producing a polytetrafluoroethylene molding powder according to claim 1, wherein the compound represented by the following formula (1) is present during the suspension polymerizing at a concentration of from 150 to 1,200 ppm and the polytetrafluoroethylene molding powder formed by the suspension polymerizing has a bulk density of from 0.45 to 0.50 g/mL according to JIS K6891.

19. The process for producing a polytetrafluoroethylene molding powder according to claim 1, further comprising:
after the milling, agglomerating the polytetrafluoroethylene molding powder to form a polytetrafluoroethylene agglomerated product having a bulk density of from 0.80 to 1.00 g/mL according to JIS K6891.

20. The process for producing a polytetrafluoroethylene molding powder according to claim 1, wherein the polytetrafluoroethylene molding powder has a specific surface area of from 1.7 to 2.2 m²/g.

21. The process for producing a polytetrafluoroethylene molding powder according to claim 1, wherein the polytetrafluoroethylene molding powder has standard specific gravity of 2.157 to 2.168 according to ASTM D4894-98a.

22. The process for producing a polytetrafluoroethylene molding powder according to claim 1, wherein the polytetrafluoroethylene molding powder has a dielectric breakdown voltage of film of from 11.5 to 12.8 kV/0.1 mm measured by packing the polytetrafluoroethylene molding powder in a mold and compression-molding at 25° C. at 15.7 MPa, followed by sintering by heating at 370° C. for 4 hours to obtain a molded product (fired column block) then subjecting the molded product to a dielectric breakdown voltage test in accordance with JIS K6891.

23. A process for producing a polytetrafluoroethylene agglomerated product, which comprises a step of agglomerating the polytetrafluoroethylene molding powder produced by the process as defined in claim 1.

24. The process for producing a polytetrafluoroethylene agglomerated product according to claim 23, wherein the step of agglomerating the polytetrafluoroethylene molding powder is carried out by a wet agglomeration method in a two phase liquid medium comprising water and an organic medium.

25. The process for producing a polytetrafluoroethylene agglomerated product according to claim 23, wherein the polytetrafluoroethylene agglomerated product has an average particle size of from 300 to 500 μm.

* * * * *